(12) United States Patent
Weiβ

(10) Patent No.: US 8,893,747 B2
(45) Date of Patent: Nov. 25, 2014

(54) VALVE WITH AN ACTUATOR

(75) Inventor: Johann Weiβ, Wangen (DE)

(73) Assignee: SVM Schultz Verwaltungs-GmbH & Co. KG, Memmingen (DE)

( * ) Notice: Subject to any disclaimer, the term of this patent is extended or adjusted under 35 U.S.C. 154(b) by 631 days.

(21) Appl. No.: 12/965,232

(22) Filed: Dec. 10, 2010

(65) Prior Publication Data

US 2011/0140018 A1 Jun. 16, 2011

(30) Foreign Application Priority Data

Dec. 15, 2009 (DE) .................. 10 2009 058 164

(51) Int. Cl.
*F16K 31/06* (2006.01)
*F16K 11/052* (2006.01)

(52) U.S. Cl.
CPC ............ *F16K 31/06* (2013.01); *F16K 31/0682* (2013.01)
USPC .................................. 137/625.44; 251/129.03

(58) Field of Classification Search
USPC ........... 137/522, 523, 625.44; 251/84, 85, 87, 251/129.03, 299
See application file for complete search history.

(56) References Cited

U.S. PATENT DOCUMENTS

| | | | | |
|---|---|---|---|---|
| 997,321 A * | 7/1911 | Patterson | ...................... | 251/177 |
| 2,570,450 A * | 10/1951 | Hottenroth | ................. | 251/129.2 |
| 2,717,003 A * | 9/1955 | Jay et al. | .................. | 137/625.34 |
| 2,763,460 A * | 9/1956 | Epler | ............................ | 251/218 |
| 3,086,746 A * | 4/1963 | Holleron | ......................... | 251/83 |
| 3,406,943 A * | 10/1968 | Newell | ............................ | 251/163 |
| 3,917,220 A * | 11/1975 | Gilmore | ............................ | 251/86 |
| 3,991,788 A * | 11/1976 | Kull | .............................. | 137/863 |
| 4,268,009 A * | 5/1981 | Allen, Jr. | ..................... | 251/129.2 |
| 4,527,590 A * | 7/1985 | Kolze | ........................ | 137/596.17 |
| 4,574,841 A * | 3/1986 | Hugler | ........................ | 137/625.44 |
| 4,709,619 A * | 12/1987 | Bartholomaus et al. | ..... | 92/130 D |
| 5,033,713 A * | 7/1991 | Thorsen et al. | ................. | 251/11 |
| 5,205,323 A * | 4/1993 | Baker | ........................ | 137/625.44 |
| 5,337,785 A * | 8/1994 | Romer | ...................... | 137/625.65 |
| 5,443,093 A * | 8/1995 | Stoll et al. | ................ | 137/596.17 |
| 5,653,422 A * | 8/1997 | Pieloth et al. | .............. | 251/129.2 |
| 5,967,186 A * | 10/1999 | Grueninger | .............. | 137/625.65 |
| 5,983,941 A * | 11/1999 | Fritz et al. | ................. | 137/625.65 |
| 6,003,552 A * | 12/1999 | Shank et al. | ............. | 137/625.44 |
| 6,318,408 B1 * | 11/2001 | Fukano et al. | ............. | 137/625.44 |
| 6,352,240 B1 * | 3/2002 | Eckstein et al. | .......... | 251/129.03 |
| 6,484,754 B1 * | 11/2002 | Muth et al. | ............... | 137/625.66 |
| 6,786,238 B2 * | 9/2004 | Frisch | ....................... | 137/625.65 |

FOREIGN PATENT DOCUMENTS

| | | |
|---|---|---|
| DE | 43 09 695 | 9/1994 |
| DE | 44 05 657 | 8/1995 |
| EP | 0 578 168 | 1/1994 |
| EP | 1 045 150 | 10/2000 |
| EP | 1 371 888 | 12/2003 |
| WO | WO 2008/043381 | 4/2008 |

\* cited by examiner

*Primary Examiner* — John Fox

(74) *Attorney, Agent, or Firm* — Preti Flaherty Beliveau & Pachios LLP

(57) ABSTRACT

The invention refers to a valve, in particular a pneumatic valve with a tappet or nipple provided on an actuator member that opens or closes a passage opening for a medium depending on the position of the actuator. A tappet is provided the spring of that presses the tappet or nipple on the passage opening in the closed position.

18 Claims, 3 Drawing Sheets

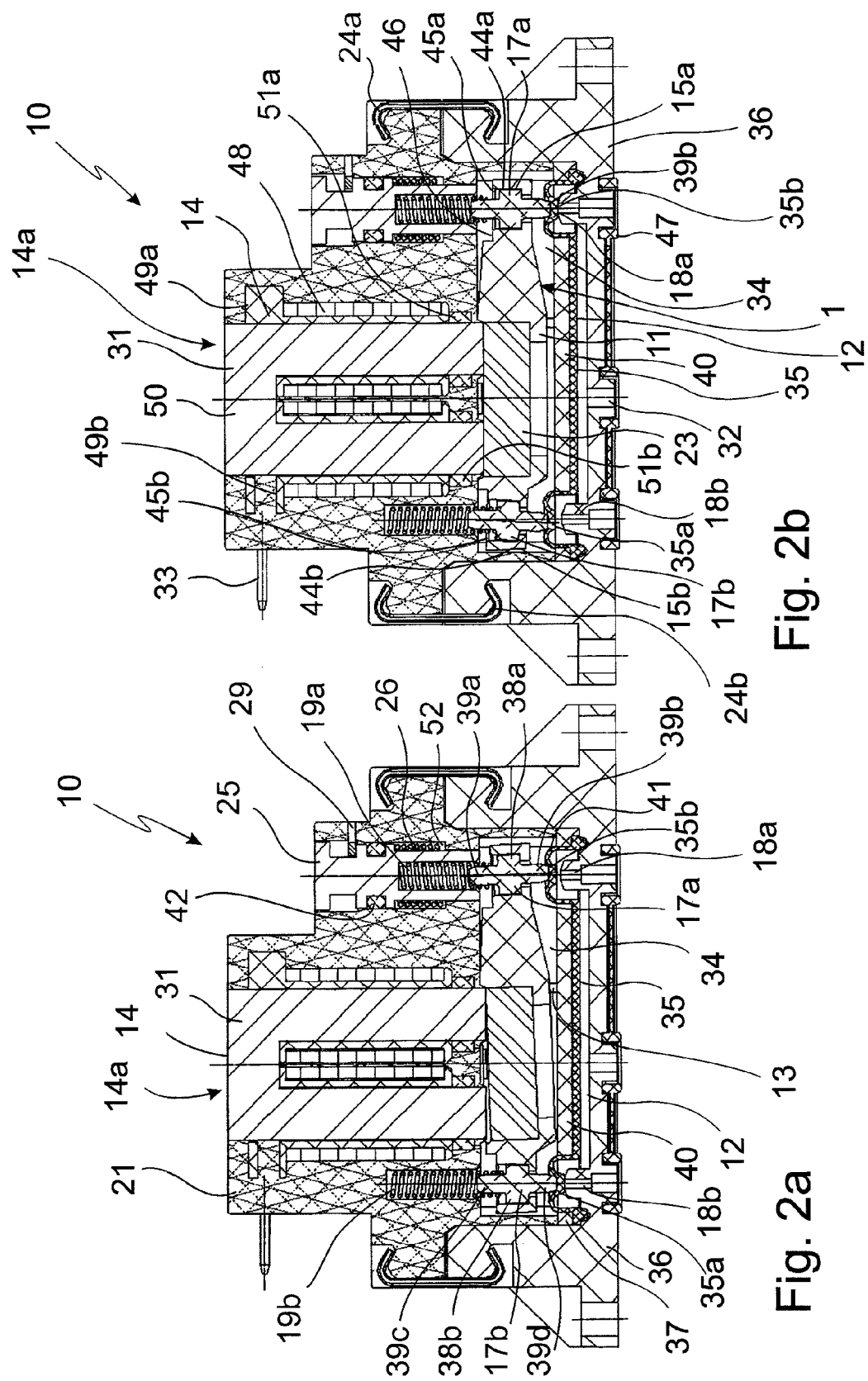

VALVE WITH AN ACTUATOR

Figures 1A, 1B:
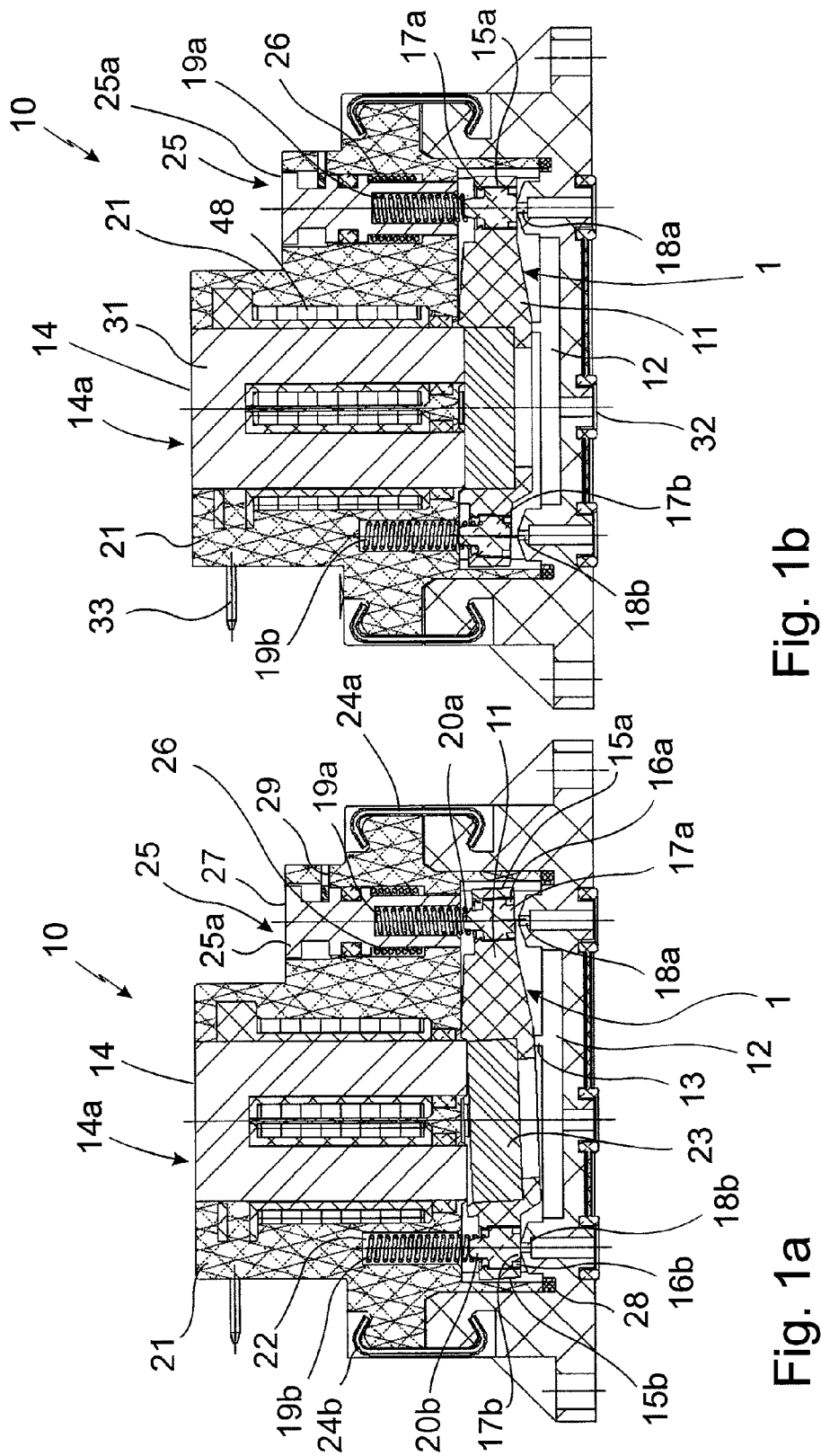

The invention refers to a valve with a tappet provided on an actuator, the tappet opening or closing a passage opening for a medium depending on the position of the actuator.

BACKGROUND OF THE INVENTION

There are known valves where the actuator is designed as rocker armature, and the beam-shaped rocker armature carries one or more tappets each serving for opening and closing, respectively, a passage opening. The passage opening has here a connection with a suitable fluid link; as fluid or medium, for example, gases, compressed air or even liquids are provided.

With the known valves the rocker armature is operated by a solenoid attracting the rocker armature when under current, that then carries out a swiveling motion. In the respective position of the rocker armature the one or the other of the passage openings is opened and closed, respectively. This is done by reciprocal pressing of a seal element on the passage opening. The known valve constructions have a readjusting spring for the rocker armature; the readjusting spring serves here for returning the rocker armature in the non-current condition (the coil is no more under current) back in the first position. The seal element is here arranged fixedly on the rocker armature, and has a suitable elasticity to form a safe seal with the passage opening. However, just in the application case of a rocker armature it has to be taken into consideration that the seal element is not angled in a linear motion against the passage opening, but in a circular arc motion with the risk of the sealing being not a hundred percent. Actually, certain leakage rates have been observed in corresponding valve constructions, in particular when they become older. Another disadvantage of conventional valve constructions is the fact that the readjusting spring acting on the rocker armature is arranged in the valve housing or in the valve space. The result are flow resistances for the fluid or medium flowing through the valve housing. There is also the risk of deposits and the like forming on the readjusting spring what is not desired.

SHORT ABSTRACT OF THE INVENTION

It is an object of the present invention to improve a valve as described in the beginning in such a way that it shows a smaller leakage.

The problem of the invention is solved by a valve, in particular a pneumatic valve wherein on an actuator a tappet or nipple is provided opening or closing a passage opening for a medium depending on the position of the actuator. It is provided here that at least the spring power of a tappet spring presses the tappet or nipple in the closed position on the passage opening. The advantage of the valve embodiment according to the invention is that an impingement of the tappet or nipple is carried out. In contrast to the devices known from the state of the art not or not only the actuator is spring-impinged. The direct spring impingement of the tappet or nipple improves essentially the seal fit. Additionally it is guaranteed that the corresponding tappet or nipple always returns in the sealing position as this return is not carried out by operating or shifting or swiveling the actuator, but is done by spring impingement. This achieves an independence from a spring guiding or moving the actuator or any other readjusting devices. By means of the tappet spring that presses the tappet or nipple directly, favorably in a linear motion, on the passage opening, and thus an active connection intermediated via the tappet or the nipple exists, the seal of the passage opening is guaranteed permanently and safely, an optimum seal fit with low leakage is thus guaranteed. This perfect seal fit leads to a significant reduction of the leakage amounts of the valve, and thus to the provision of an essentially more reliable and permanent valve system altogether, that, for example, can also be used for dosage tasks in the area of small and smallest amounts (ml to µl). The design of the valve according to the invention is additionally independent of the embodiment of the respectively used actuator. The actuator serves as holding device and guide for the tappet or nipple, the actual operation of the tappet or nipple, that means the motion onto a closing position on a passage opening is then achieved by the interaction of the motion of the actuator and the tappet spring. Through this there is also the possibility that the entire device can be designed much more compact, and therefore can be used for application ranges where there is only limited space for assembly.

A preferred development of the invention provides that the tappet spring acts directly on the tappet or nipple. This design of the valve according to the invention has the advantage that here an immediate effect on the tappet or nipple occurs, and pressing the tappet or nipple on the passage opening is not carried out intermediated via the actuator. The immediate arrangement of the tappet spring on the tappet or nipple has the additional advantage that the position of arrangement for the spring is easier accessible and from this advantages follow for the assembly of the system. Because of the preferred active direction of the spring the spring is arranged on the side of the tappet or nipple opposite the passage opening, and thus is not in the immediate range of flow, in the valve space or the valve housing. The result is that also the arrangement of a tappet spring for each tappet or nipple does not increase the flow resistance in the valve according to the invention.

The tappet or nipple is in the valve according to the invention supported in the actuator. On the one hand, there is the possibility of designing tappet or nipple and actuator in one piece, besides, the tappet or nipple can be connected fixedly with the actuator and be manufactured, for example, of a material differing from the one of the actuator. A development of the invention seen as favorable provides that the tappet or nipple is supported with clearance in the actuator. This has the advantage that, besides a cushioning by the tappet spring, another means of compensation is created that prevents the tappet or nipple from hitting the passage opening unsprung when the valve is operated. Through this it is avoided that the power exerted in the actuator is too high, and the switching process is made altogether more even. A support of the tappet or nipple with clearance has additionally the chance of further adapting or adjusting the tappet or nipple, either by a suitable sizing of the tappet spring or by varying the tappet or nipple position in the actuator. Also with regard to the energy efficiency of the electro magnetic drive for the actuator the movable support of the tappet or spring has advantages. During operation of the valve according to the invention no irregularities in the passage opening, or in tappet and spring, respectively, have to be compensated by the actuator. Thus, in particular during operation with a solenoid, the actuator can be attracted completely to the solenoid. The air gap between actuator and solenoid occurring with conventional valves that is accompanied by holding current can thus be closed completely. The result is a lower rest power of the solenoid. The optimal pressing and thus sealing of the passage openings by the tappet or nipple is effected by the tappet spring, so that the actuator is provided only as guide means for the tappet or nipple, while the actual closing of the passage opening is reached by the interaction of tappet or nipple and tappet spring.

The support of the tappet or nipple with clearance allows additionally a compensation of dimensional inaccuracies as here still a possibility for varying with regard to the pressing of the tappet or nipple exists. Dimensional inaccuracies are, for example, a result of fade or swelling of the tappet or nipple and the material of the tappet/nipple, respectively, but also, after a certain number of switching cycles, by the wear of the tappet or nipple and the passage opening, respectively, as a result of material compression and decompression or by contact with the medium flow to be controlled.

The free motion of the tappet or nipple in the actuator is here provided in particular in the direction of the spring power so that, when the tappet or nipple is spring-impinged, the result is, first of all a shifting in the actuator, before the tappet or nipple meets the passage opening and acts on it. Eventually, the tappet spring is responsible for the tight pressing of the tappet or nipple on the passage opening, the motion of the actuator makes sure that the tappet or nipple gets in active contact with the passage opening at all.

According to a modification of the invention it is possible that the tappet is designed as nipple, and acts immediately on the passage opening. The tappet designed as nipple can here be formed in the way of a double nipple. The flange arranged between the two nipple parts serves for fixing or arranging the nipple in the actuator. While the one part of the nipple projects in the readjusting spring, the nipple part opposite the flange acts on the passage opening. The nipple can here be designed in such a way that a positive locking engagement in the passage opening can be realized by the nipples. Differently from the design as tappet or nipple, that only covers the passage opening, thus an even further improved seal of the passage opening is achieved. Also the reduced support surface between nipple and passage opening contributes to that, so that here the exerted power can be increased improving the seal of the passage opening. In a preferred embodiment of the invention here the tappet realized as nipple is created of an elastic material, for example elastomer rubber such as EPDM or the like in order to secure a reliable seal of the passage opening. However, altogether all characteristics described in the following in connection with the tappet can be transferred to the nipple. If in the following the term tappet is used this comprises in the same way a nipple and vice versa.

An advantageous development of the invention is characterized in that between the valve space flown through by the medium and the tappet or nipple a membrane is arranged, and the tappet or nipple acts on a membrane part for opening and closing, respectively, the passage opening. The valve space is the area of the valve that is flown through by the medium controlled by the valve or the medium flow by the medium itself. At least one passage opening for the medium to be controlled via the valve or the medium flow is arranged in the valve space. The valve space is also sealed by the membrane liquid or fluid-proof against the operating elements of the valve according to the invention, so that no fluid contact occurs between the operating elements and the valve space. Because of the flexibility of the membranes, however, a seal of the passage opening or the passage openings can be carried out. The advantage of this embodiment of the valve according to the invention is the fact that a construction of valve chamber and operating device or armature space of the valve where the medium is completely separated is reached. Thus the membrane remains, however, sufficiently flexible in order to guarantee a tight fit of the tappet or the nipple on the passage opening. If the membrane is formed by a flexible material (such as, for example, synthetic material, elastomer, EPDM, Silicon, rubber) with a sufficient thickness of material, this acts, when the nipple or tappet engages on the passage opening, additionally as seal element further improving the seal fit. Here also the design of the tappet as nipple achieves an even better pressing of the membrane on the passage opening and thus an even tighter seal. The leakage amounts can be reduced significantly by this, and thus a highly leak-proof valve system can be provided that, for example, is also suited for the use with critical medium.

If the membrane is elastic, it will support the readjusting of the corresponding tappet by the readjusting spring, when the actuator falls off a magnetic opening mechanism. By means of the tappet or nipple, when the corresponding nipple for closing the passage opening is impinged, an area of the membrane corresponding with the passage opening intermediated by the nipple in the passage opening is pressed in or on it, and thus closes it additionally.

In another modification the invention suggests that the direction of motion of the actuator runs essentially perpendicular or parallel to the seal surface of the passage opening. The design of the valve according to the invention allows a number of configurations. Through this very different concepts for the construction of the valve according to the invention can be realized, and there are different possibilities for opening and closing, respectively, of a passage opening. If the motion of the actuator is carried out parallel to the seal surface the tappet or nipple arranged on the actuator is pushed on or over the passage opening and closes it or releases it. At the same time, it can be also provided that during a suitable motion of the actuator by the tappet or nipple a first passage opening is released, while a second passage opening is closed. This embodiment in the way of a slide makes additionally a successive opening or closing of the passage opening possible. If the motion of the actuator is carried out perpendicular to the seal surface of the passage opening, the tappet or nipple is pushed or pressed vertically on the passage opening, when the actuator is moved, and closes and opens, respectively, it more or less all of a sudden.

Conveniently the actuator is designed as hinged armature. It is seen as particularly convenient here if the hinged armature is designed rocker-like or as rocker armature. The hinged armature or the actuator can carry a tappet or nipple on at least one end, the tappet or nipple again, as provided according to the invention, being connected with a tappet spring or projecting in a tappet spring, so that because of the spring power of the tappet spring the tappet is pressed in the closing position on the passage opening. The rocker armature or hinged armature does not have its own readjusting elements, such as for example readjusting springs associated with the actuator (without excluding them according to the invention), but serves only as transfer element for the driving energy exerted in the valve. Swiveling or folding the armature is supported or guided by the tappet or nipple springs associated with the tappet(s) or nipple(s). The armature can, depending on the embodiment, be arranged on different places of the valve, or have a corresponding link point. If the armature is designed as hinged armature, it has a link point in the valve or valve box around that then the armature can swivel. If the armature is designed as rocker armature, in particular with tappets or nipples arranged on both ends, it has to be seen as favorable if in the arrangement or armature space a suitable web is arranged on that the armature is supported and can be swiveled around the support point provided there.

A corresponding arrangement of the armature is provided when the armature space is constructed in the valve that may be provided as separate element in the valve system.

Another embodiment of the valve according to the invention seen as favorable provides that the operating element is designed as longitudinally movable armature. Also a tappet or nipple is associated with it that is pressed or slid on a passage opening and closes it by the motion of the armature, or can be adjusted together with the tappet or nipple by the readjusting or spring power of the tappet or nipple spring from a closing position in an opening position for the passage opening. In order to carry out a motion of the armature the drive of the valve is designed accordingly, or gears or the like are provided to translate the motion of the drive in a longitudinal motion of the armature.

In another modification the invention suggests that for the motion of the actuator at least from the opened to the closed position of the valve or the passage opening a drive is provided. The drive can be here designed in particular as solenoid, mechanically movable permanent magnet, as electro motor or as piezo array. Of course, a combination of the different ways of driving is also possible in one and the same valve where the corresponding drives then act on different areas of the actuator or can be used for opening or closing of different passage openings if they interact directly or indirectly with the nipples or tappets. The use of a solenoid is seen as favorably as through this the best control of the actuator can be achieved. If the solenoid is under current, for example, a magnetic body provided in the actuator or the magnetic actuator itself is attracted to the coil or the core of the solenoid and here the actuator is swiveled or set from a first into a second position. This setting or swiveling of the actuator puts the tappet or nipple arranged on the actuator from a first in a second position, and a tappet spring acting directly on the tappet and/or the actuator is compressed. Of course, through the motion of the actuator also the motion in opposite direction can be carried out, that means that by adjusting or swiveling the actuator the tappet or nipple is moved from a first into a second position, wherein a tappet spring is relaxed or partly relaxed, and presses here the tappet or nipple on a passage opening so that this is sealed by the tappet. Through this motion of the actuator, and the change of position caused by it, then, for example, a passage opening is either released so that here a medium flow can take place, or it is closed so that a medium flow is stopped. By a suitable circuit the current-flow of the solenoid ends and the actuator or the magnetic body arranged on it falls off the coil or the core. Caused by the readjusting power of the spring, when the actuator falls off the solenoid, the tappet and thus also the actuator is lead back from a second into a first position, and the tappet or nipple is pressed, for example, on a passage opening so that this is sealed. If a permanent magnet is provided as drive for the actuator, this can be moved mechanically, and through this mechanical motion of the magnet a corresponding positioning of the magnetic field with reference to the actuator can be carried out, that again has the result that the actuator provided with a magnetic body and/or designed magnetically is brought from a first position into a second position, and the effects already described before in connection with a solenoid occur here.

If the drive is designed as electro motor, that is also possible according to the invention, a particularly precise control of the closing or opening motion of the actuator and/or the tappet or nipple arranged on it can be carried out. The electro motor can be designed as stepper motor. A variation step-by-step of the opening width of the passage opening can be reached and controlled via a step-by-step operation of the motor. For that suitable controls can be provided. As drive for the actuator also a piezo array can be used using the inverse piezo effect, and because of the deforming, when electric voltage is connected, a motion of the actuator and/or the tappets/nipples occurs that brings the valve or the tappet or nipple sealing the passage opening from a first into a second position.

According to a modification of the invention it is possible that the tappet spring is supported in a longitudinally movable operating body serving in particular as hand key. The operating body can act, if required, via the tappet spring on the tappet or the actuator. The operating body or hand key can be provided here as emergency control for the valve. If there is no need of a corresponding emergency control the operating body can be retained by the power of a readjusting spring in non-released position. The tappet spring can then act on the tappet independently of the operating body. Only when the hand key is used, first of all the readjusting spring associated with the operating body is compressed. After that then the operating body acts on the tappet spring that then again effects a suitable pushing or pressing of the tappet or nipple on the passage opening, and thus causes its sealing. The spring power of the readjusting spring is here significantly higher than the spring power of the tappet spring so that no accidental compression of the readjusting spring can occur in the course of the operation of the valve. The springs also have the same active direction so that an unintentional compression of the springs is not possible. The hand key or operating body effects the same motion of the actuator as a drive associated with the actuator, that means via the hand key the same operating position is reached as by using a suitable drive as described above. Because of the longitudinally movable embodiment of the operating body and the hand key, respectively, this acts parallel to the active direction of the spring, that means that by operating the key sealing of a passage opening can be carried out, and when the actuator or hinged armature is designed accordingly, at another point of the valve a passage opening is opened. The hand key, emergency control or a suitable operating body thus has the same function as the tappet spring.

Another advantageous modification of the invention provides that the tappet is designed in two pieces, and the tappet spring is arranged between the tappet parts, the tappet spring being supported reciprocally on the tappet parts. The two-piece tappet is arranged or received on or in the actuator, and the tappet spring arranged between the tappet parts supported movable in the actuator, is compressed, when the position is closed, by the tappet part pressed on the passage opening, and improves, because of the spring power, the pressing the tappet part on the passage opening. The tappet spring is here supported on the second tappet part, which is again supported in the actuator, supported on the actuator also arranged in the actuator. When the motion is in opposite direction where the second tappet part is stressed the tappet spring is supported on the first tappet part that, as already noted above, is also supported or held in the actuator. This embodiment of the valve according to the invention has the already mentioned advantages in reducing the leakage amounts, and allows here at the same a particularly compact structural shape as the tappets and the tappet spring can be integrated in the actuator so that no additional recesses or grooves have to be provided for the arrangement of the tappet spring in the rest of the valve body. The actuator here also serves for guiding or as holding means for the tappet or nipple. An almost leakage-free pressing of the tappet or nipple on the passage opening is then carried out by spring impingement by the tappet spring. This is carried out here also essentially linear so that an even seal fit of the tappet or nipple on the passage opening is guaranteed in the respective sealing position.

In another modification the invention suggests that the actuator carries two tappets, each of the tappets interacting with one passage opening each, and at least the spring power of one tappet spring presses at least one first tappet in the closed position on the passage opening, while the other tappet opens the passage opening associated with this tappet. If the actuator is designed, for example, as rocker or hinged armature the respective tappets can be arranged on opposing ends of the armature or the armature rocker. The armature, because it is operated, then is swiveled or collapses, and together with that the position of the tappets arranged on the ends of the armature changes. By swiveling the armature here a first passage opening associated with a first tappet is opened, and, at the same time, by the second tappet a second passage opening is closed, so that here the medium flow changes. Thus, for example, in a first position a medium can flow via a working link for deaerating while in a second position the medium can flow via a pressure supply to a working link, as here each time corresponding passage openings are closed or released controlled by tappets. It is, of course, also possible that the respective passage openings are arranged on different sides of the valve space, and in the course of a linear motion of the armature, when a first passage opening is released, the first tappet is pressed to a second passage opening and seals it. It is also possible that during a motion of the actuator parallel to the seal surface of the passage opening the corresponding tappet is slid over the passage opening, seals it during that, while a second tappet is shifted in an opening position and during that releases the passage opening associated with it.

The invention can be used very variably. It comprises solutions where one tappet or nipple serves for sealing or releasing one passage opening. However, the invention also comprises solutions where through one tappet reciprocally a sealing of different passage openings is carried out. Furthermore, the invention also comprises solutions where the actuator carries two or more different tappets, that themselves each are associated with one passage opening for closing and opening.

It is advantageous, if the drive is arranged between the two tappets of the valve according to the invention. Through this a swiveling, folding or shifting motion of the armature is made considerably easier as the drive acts centrally on the actuator, and moves it from the first to the second position, and effects at the same time that the two tappets are shifted, swiveled or moved from their positions each associated with the respective position of the actuator in the second position that can be taken by the tappet. In order to be able to exert a suitable force or to carry out a deviation of the actuator, there is also the possibility of using gears. Through swiveling motion of the actuator provided according to the invention (collapsing or rocker armature) the constructive arrangement as it just has been described achieves that even with rather small adjusting ways, that means rather small air gaps that are closed during the attraction motion actually rather large adjusting ways for the nipple or tappet are achieved. By supporting the nipple or tappet with clearance in the actuator, in the course of collapsing or swiveling the actuator this can come in complete contact, for example, with a solenoid, the air gap thus sealed completely. This reduces the holding current significantly as the hinged or rocker armature is pulled through completely, and thus the air gap is closed. The solenoid provided according to the invention for the use with the valve thus has only a small rest performance, and this leads to an increase of the energy efficiency of the entire device.

BRIEF DESCRIPTION OF THE DIFFERENT VIEWS OF THE DRAWINGS

Figure 1C:
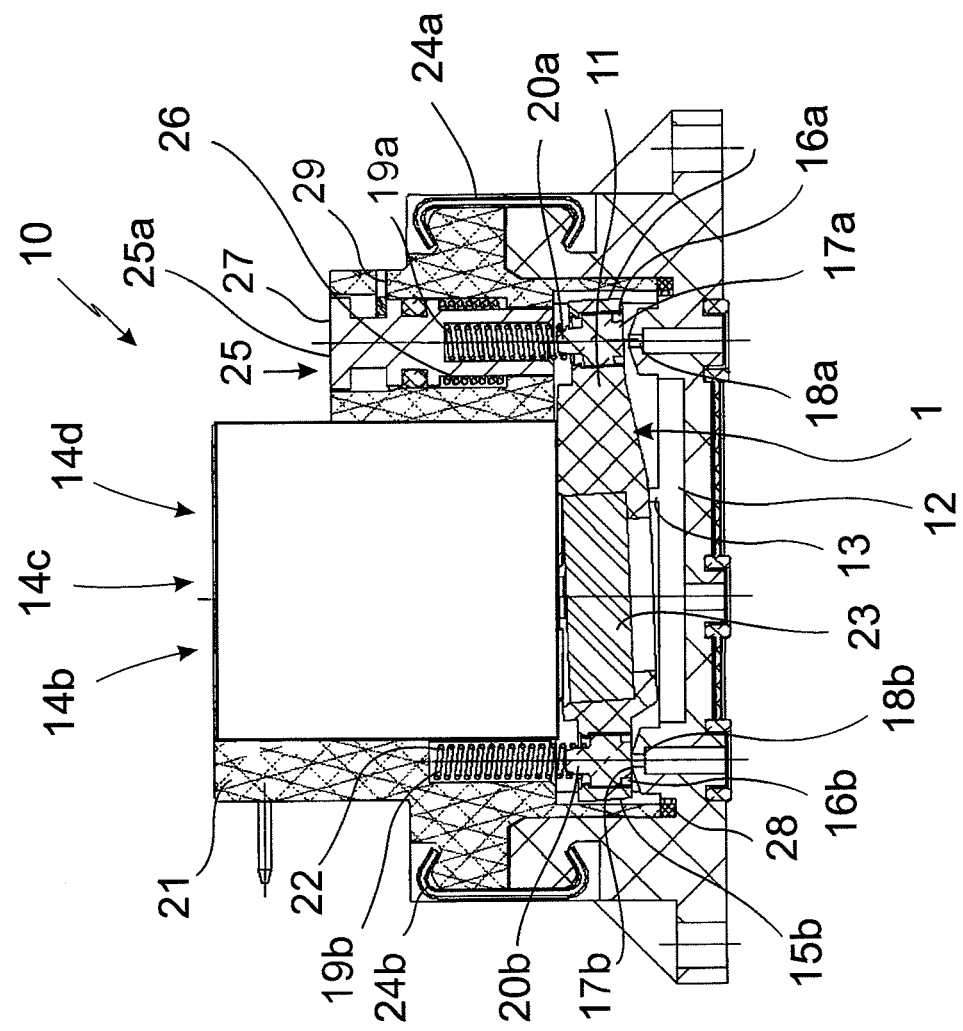

In the drawing the invention is shown schematically, in particular in different examples. In the figures:

FIG. 1a A valve shape according to the invention in currentless condition in the lateral sectional view, FIG. 1b the valve of FIG. 1a under current, also in lateral sectional view, FIG. 1c the valve of FIG. 1a in currentless condition with schematically indicated other types of drives for the hinged armature, FIG. 2a another embodiment of the valve according to the invention in currentless condition in lateral sectional view, FIG. 2b the embodiment of the valve of FIG. 2a under current, also in lateral sectional view.

In the figures identical or corresponding elements each are indicated by the same reference numbers, and are therefore, if not useful, not described again.

DETAILED DESCRIPTION OF THE PREFERRED EMBODIMENT

FIG. 1a shows a switching position of the valve 10 according to the invention. Valve 10 is a solenoid valve with a hinged armature 11 arranged above a valve space 12. The hinged armature 11 is supported on a web 13 also positioned in the valve space 12, and can be swiveled by a suitable circuit of the magnet body 14 of a solenoid 14a from a first into a second switching position. The hinged armature 11 has on its ends 15a, b recesses 16a, b in that each time a tappet or nipple 17a, b is inserted. The tappets or nipples 17a, b are supported with clearance in the recesses 16a, b, therefore their position can, if required, be changed. A position change of this kind is carried out, for example, when the valve 10 is switched, if one of the tappets or nipples 17a, is put on the passage opening 18a, b associated each time with the respective tappet or nipple 17a, b. Each tappet or nipple 17a, b has a tappet spring 19a, b associated with it that exerts a spring power on the tappet or nipple 17a, b that presses it in the closed position on the associated passage opening 18a, b. In the example the tappet or nipple 17a, b has an extension 20a, b pointing in the direction of the tappet spring 19a, b projecting in the respective tappet spring 19a, b. The tappet spring 19a, on the left hand side in FIG. 1a, is inserted in a boring 22 in the housing 21 receiving the magnet bodies 14. The tappet spring 19b is supported, on the one hand, in the boring 22, and, on the other hand, on the tappet or nipple 17b. When the hinged armature 11 is swiveled, via the tappet or nipple 17b the tappet spring 19b is compressed. When the hinged armature 11 falls off the magnet body 14, the readjusting power of the tappet spring 19b effects a return of the tappet or nipple 17b in the direction of the passage opening 18b and a pressing of the tappet or nipple 17b to it so that a sealing of the passage opening 18b is carried out. In order to be able to interact with the magnet body 14, the hinged armature 11 has an insert 23 of magnetizable material or is made completely of magnetic material.

In the example the drive is provided in the shape of a solenoid 14a as a component, and the valve space 12 with the passage openings 18a, b, the hinged armature 11 and the tappets or nipples 17a, b arranged on it are provided as another component.

As shown schematically in FIG. 1c, instead of the solenoid 14a a mechanically movable permanent magnet 14b, an electro motor 14c or a piezo array 14d can be used as drive. These then act on the hinged armature 11 to move it between the switching positions, and are arranged, if required, or in adaptation to the respective purpose of use, on the shown or another position of the valve 10 seen as convenient. The components are assembled during mounting, and fixed via the clamps 24a, b. An operating body 25 serving as emergency control is associated with the tappet or nipple 17a on the right hand side in FIG. 1a. This is received in a suitable recess in the housing 21, and has a readjusting spring 26 supported in the housing 21. To carry out an emergency operation of the tappet or nipple 17a, for example to seal the passage opening 18a associated with this tappet or nipple 17a and to open the opposite passage opening 18b after swiveling the hinged armature 11, the readjusting spring 26 is compressed by force exerted on the top end 27 of the operating body 25. In the course of the further motion of the operating body 25 the tappet or nipple 17a is impinged so that it is pressed on the passage opening 18a. This motion of the tappet or nipple 17a is followed also by a swiveling of the hinged armature 11, the other tappet or nipple 17b arranged there releasing the second passage opening 18b. Also through this the mechanic operating of the drive of the valve 10 without switching on can occur so that, for example, when the power is out, nevertheless a switching of the valve 10 is possible, for example as emergency triggering.

To guarantee a seal of the magnet body 14 towards the valve body 30 it is provided to insert an elastomer molded seal or O-ring seal 28.

The operating body 25 is secured in the magnet body 14 by a retaining plate 29 that is pressed after inserting the operating body 25, and thus secures the operating body 25 against falling out of the magnet body 14. In order to reduce weight the hinged armature 11 can be made, for example, mainly of synthetic material. The insert 23 is then inserted in the hinged armature 11. The insert 23 consists of magnetic material, and can either be inserted in the hinged armature 11 or be extrusion-coated in an injection molding process with the material of the hinged armature 11, and thus is imbedded in it. Also with reference to the tappet or nipple 17a, b the freedom of choice of the used materials is rather large. Tappets or nipples 17a, b of elastic synthetic materials adapting ideally to the passage openings 18a, b, when they are pressed on, and effecting here a particularly advantageous sealing have proved to be especially convenient.

The embodiment of the valve 10 according to the invention already described in the connection with FIG. 1a is shown in FIG. 1b in another switching position. Here the coil 48 of the magnet body 14 is fed with current, and thus the magnetic part of the hinged armature 11 is attracted to the yoke 31. Through this compression occurred of the tappet spring 19b, on the left in FIG. 1b, as the associated tappet or spring 17b is lifted by the swiveling movement of the hinged armature 11 from the passage opening 18b, and thus releases it. Together with the lifting of the tappet or nipple 17b the tappet spring 19b is compressed that thus accumulates spring power that has the result that, after the hinged armature 11 has fallen off the magnet body 14 or the yoke 31, the tappet or nipple 17b is pushed back in its starting position, and seals the passage opening 18b. The motion of the hinged armature 11 opened, on the one hand, the passage opening 18b, and, on the other hand, the passage opening 18a associated with the tappet or nipple 17a arranged on another end 15b of the hinged armature 11. When the hinged armature 11 is swiveled the tappet spring 19a expands, and thus the tappet or nipple 17a is pushed on the passage opening 18a. The operating body 25 remains during the entire switching process in its starting position in that it is retained by the readjusting spring 26 supported in the housing 21 of the magnet body 14. The operating body 25 serves only for emergency operation that means, if, for example, during a power failure the valve 10 cannot be switched electro magnetically. The consequence of swiveling the hinged armature 11 is a change of the medium flow through the valve space 12. Now the medium flows in the valve space 12 via the passage opening 18b that is in connection with the pressure supply of the device and is opened by the lifting of the tappet or nipple 17b, and can leave the valve space 12 via the working link 32. In the position shown in FIG. 1a the passage opening 18b connected with the pressure supply is sealed by the tappet or nipple 17b, that means in this case the medium flows via the working link 32 to the passage opening 18a that is responsible for deaerating the valve space 12.

To be able to carry out feeding the magnet body 14 with current it has on its upper left end an electric interface 33 comprising suitable link contacts for the connection with a power supply.

FIG. 2a shows another possible embodiment of the valve 10 according to the invention. In the shown embodiment an armature space 34 where the medium is separated from the valve space 12 is illustrated. This separation of media is the result of a membrane 35 inserted between the armature space 34 and the valve space 12. The membrane 35 is anchored in the valve slab 36 and fixed in its position via a suitable press rail 37. The membrane 35 is designed flexible and thus makes it possible that the tappets 17a, b designed in the example of FIG. 2a as nipples seal the passage openings 18a, b via the membrane 35. Because of the elastic material the membrane 35 can be pressed partially in the passage openings 18a, b and thus seal it fluid-proof. When the valve is operated without membrane this seal can be improved additionally by the design of the tappets/nipples 17a, b. The tappets or nipples 17a, b have, besides a central flange 38a, b, two ends 39a, b, c, d orientated in opposite direction. The ends 39a, c project in the tappet springs 19a, b, and present here a contact surface for the tappet springs 19a, b that are supported additionally on the flange 38a, b. The two other ends 39b, d are connected non-positive with the membrane 35 and press it equally shaped on the passage openings 18a, b.

Additionally to the membrane 35 the armature space 34 is separated towards the valve space 12 by a slab 40 with suitable supporting webs 13 for the armature 11 on its surface facing the armature 11, via these webs the armature can be swiveled when the valve 10 is operated. The slab 40 with membrane 35 can be manufactured as one component, and thus makes assembly of the valve 10 according to the invention easier. In the direction of the armature 11 the membrane 35 inserted in the slab 40 has a cup-like bulging 41 encircling positive-locking the nipple ends 39b, d. This further improves the seal.

The embodiment of FIG. 2a also has an emergency trigger 25 for the valve 10. This consists of the operating body 25a held via a readjusting spring 26 in the housing 21 of the magnet body 14. For mounting the emergency system, first of all the corresponding boring 52 is provided in the housing 21, a readjusting spring 26 is inserted in it supported on the bottom of the boring 52. After that a seal 42 is inserted, and finally, the operating body 25a is slid in the boring 52. In order to secure the operating body 25a against falling out of the housing 21, a retaining plate 29 is provided that is slid in laterally in the housing 21, and engages in suitable gaps between the collars 43 provided on the operating body 25a. When the emergency trigger is used, the operating body 25a is pressed in the housing, and acts here directly on the tappet or nipple 17a so that this is pressed on the passage opening 18a.

In FIG. 2b the embodiment of the valve 10 of FIG. 2a is shown in the working position. Here a magnet body 14 is fed with current, and the hinged armature 11 was swiveled, together with a release of the passage opening 18b, on the left hand side in FIG. 2b, carried out by lifting of the tappet or nipple 17b. Simultaneously with the release of the passage opening 18b the passage opening 18a was sealed as the tappet or nipple 17a is pressed on the passage opening 18a. The intermediately supported membrane 35 is here pressed on the passage opening 18a together with the nipple end 39b of the nipple/tappet 17a. Thus a very tight sealing of the passage opening 18a can be carried out.

The valve 10 altogether comprises four functional components. These are, on the one hand, the magnet body that is the drive for the entire valve 10. In the embodiment this magnet body 14 comprises a solenoid 14a with suitable electric interfaces 33. Instead of the solenoid 14a here also a permanent magnet can be provided that can be moved through a suitable shifting device. Also the employment of an electro motor 14c or a piezo array 14d for operating the hinged armature 11 is possible. The last-mentioned drive variations are shown schematically in FIG. 1c, however, without any problems they can be transferred from the embodiment shown in FIGS. 2a and 2b, and be employed in this and other not-shown embodiments of the invention.

The other component is the actuator 1 which is designed in the embodiment as hinged armature 11 containing the nipple/tappet 17a, b. The hinged armature 11 can be formed as separate component, for example, of synthetic material and have a magnetic insert 23. During manufacturing the insert 23 can be extrusion-coated with the material of the hinged armature 11 in an injection-molding process. Of course, also the design of the hinged armature 11 without insert and the subsequent assembly of the insert 23 in the hinged armature blank is possible. The hinged armature 11 has on its ends 15a, b annular recesses 44a, b in which the tappets or nipples 17a, b are inserted. The tappets or nipples 17a, b are supported with clearance in the recesses 44a, b. The tappets or nipples 17a, b are supported with clearance in the recesses 44a, b. To prevent the tappets or nipples 17a, b from falling out of the hinged armature 11, the tappets or nipples 17a, b are calked with a suitable ring 45a, b after they have been inserted in the recesses 44a, b, the ring 45a, b sealing only the upper surface 46 of the hinged armature 11, however, otherwise allows movement of the tappet or nipple 17a, b in the recesses 44a, b.

As another component the valve 10 according to the invention comprises the slab 40 with the membrane 35 arranged in it. This element of the valve 10 can also be manufactured as separate component, wherein the elastic material of the membrane 35 can be injected in suitable recesses in the slab 40. It is also possible to provide the membrane 35 and the slab 40 as separate parts that are assembled before they are inserted in the valve 10 and are provided as component. The last, fourth component of the valve 10 according to the invention is the valve slab 36 comprising the passage openings 18a, b and the working link 32. On the bottom side the valve slab 36 has an additional seal 47 which allows the connection of the passage openings 18a, b and the working links 32 with the suitable supplies or the like. While FIG. 2a shows the valve 10 in the closed position, that is the rest position, where the hinged armature 11 is shown in the position fallen off the magnet body 14 or the yoke 31, FIG. 2b shows the valve in the open, operated condition. An opening is here the result of the supplying the magnet body 14, in particular the coil 48, with current, and thus the insert 23 consisting of magnetic material is attracted to the yoke 31.

The magnet body 14 has a two-piece coil body 49a, b. During manufacturing the two coil bodies 49a, b are connected to each other by a connecting element with a film hinge. During mounting the connecting element is folded, and the two coil bodies 49a, b are arranged parallel beside one another. After folding the core 50 is inserted in the coil body 49a, b, and the part of the core 50 extending over the coil bodies 49a, b is slid on through seals 51a, b extending over the core 50 or the areas projecting out of the coil body 49a, b. The corresponding seals 51a, b are conical nipples, which are shrunk on the projecting core areas after inserting, and after that, extrusion-coated by a suitable sealing material. By means of that an essentially improved sealing of the magnet body 14 towards the armature space 34 is achieved, and the construction is thus designed altogether more permanently. To connect the valve slab 36 with the magnet body 14 clamps 24a, b are used that are inserted in associated grooves on the valve slab 36 or the magnet body 14, and clamp these two components together and thus form the finished valve.

Although the invention has been described by exact examples that are illustrated in the most extensive detail, it is pointed out that this serves only for illustration, and that the invention is not necessarily limited to it as alternative embodiments and methods become clear for experts in view of the disclosure. Accordingly, changes can be considered that can be made without departing from the contents of the described invention.

The invention claimed is:

1. A valve comprising:
a body with a passage opening for a medium;
an actuator having a recess;
a tappet, having first and second ends, disposed with clearance within the actuator recess and configured for linear movement within the recess;
a longitudinally movable operating body serving as a hand key;
a readjusting spring; and
a tappet spring, supported in the longitudinally movable operating body, in direct, linear mechanical cooperation with the first end of the tappet, the tappet spring configured to bias the second end of the tappet towards the passage opening,
wherein the tappet is in a closed position, on the passage opening, when the actuator is in a first position and the tappet is in an open position, spaced from the passage opening, when the actuator is in a second position, and
wherein the operating body acts against the power of the readjusting spring, via the tappet spring, on the tappet and the actuator, respectively.

2. Valve according to claim 1, characterized in that the tappet acts directly on the passage opening.

3. Valve according to claim 1, characterized in that the tappet is comprised of an elastic material.

4. Valve according to claim 3, wherein the elastic material is synthetic rubber.

5. Valve according to claim 1, characterized in that a sealing surface of the passage opening is provided, and the actuator has a direction of motion wherein the direction of motion of the actuator is essentially perpendicular to the sealing surface of the passage opening.

6. Valve according to claim 1, characterized in that the actuator comprises a rocker-like, hinged armature.

7. Valve according to claim 1, characterized in that the motion of the actuator from the open position to the closed position is through operation of a drive, wherein the drive is provided as one of a solenoid, a mechanically movable permanent magnet, an electromotor, or a piezoelectric array.

8. Valve according to claim 1, having at least a first and a second passage opening and a first and a second tappet, each arranged at a first end and a second end of the actuator, respectively, wherein the first tappet is interacting with the first passage opening and the second tappet is interacting with the second passage opening and wherein at least the spring power of a first tappet spring pushes the first tappet in the closed position on the first passage opening, while the second tappet opens the second passage opening.

9. Valve according to claim 8, characterized in that a drive is provided, and the drive is arranged between the first and second tappets.

10. Valve according to claim 1, wherein the tappet is designed as a nipple, interacting directly with the passage opening.

11. Valve according to claim 10, wherein the nipple is designed as a double nipple having two nipple parts with a flange arranged between the two nipple parts and wherein the flange serves for fixing or arranging the nipple in the actuator.

12. Valve according to claim 1 wherein the valve is a pneumatic valve.

13. A valve, comprising:
a housing with a valve space defined therein;
a solenoid disposed in the housing;
a web structure disposed in the valve space;
a hinged armature positioned to swivel on the web structure, the armature having first and second ends and a respective recess in each end;
first and second tappets disposed with clearance, respectively, in the first end recess and the second end recess of the armature, each of the first and second tappets having first and second ends and configured for linear movement within the respective recess;
first and second passage openings disposed, respectively, adjacent to the first and second tappets;
a first tappet spring provided in the housing in direct, linear mechanical cooperation with the first end of the first tappet and configured to urge the first tappet toward the first passage opening; and
a second tappet spring provided in the housing in direct, linear mechanical cooperation with the first end of the second tappet and configured to urge the second tappet toward the second passage opening,
a longitudinally movable operating body serving as a hand key provided in the housing; and
a readjusting spring provided in the housing and arranged in cooperation with the moveable operating body,
wherein the second tappet spring is supported in the longitudinally movable operating body,
wherein the moveable operating body acts against the power of the readjusting spring, via the second tappet spring, on the tappet and the armature, respectively,
wherein, in a first state of operation when the solenoid is inactive, the first tappet spring directly urges the first tappet to close the first passage opening and the second passage opening is open and fluidly coupled with the valve space, and
wherein, in a second state of operation when the solenoid is active, the armature is attracted to the solenoid and the first tappet is removed from the first passage opening to fluidly couple the first passage opening with the valve space and the second tappet spring directly urges the second tappet to close the second passage opening.

14. The valve according to claim 13, wherein at least one of the first and second tappets comprises an elastic material.

15. The valve according to claim 13, wherein:
each of the first and second passage openings comprises a respective sealing surface, and
wherein a motion of the solenoid is in a direction that is essentially perpendicular to the sealing surfaces of the first and second passage openings.

16. The valve according to claim 13, wherein at least one of the first and second tappets is designed as a nipple interacting directly with the corresponding first and second passage opening.

17. The valve according to claim 16, wherein the nipple comprises a double nipple having two nipple parts with a flange arranged between the two nipple parts and wherein the flange serves for fixing or arranging the nipple in the armature.

18. The valve according to claim 14, wherein the elastic material is synthetic rubber.

* * * * *